United States Patent
Hagedorn (12)

(10) Patent No.: US 9,046,155 B2
(45) Date of Patent: Jun. 2, 2015

(54) MULTI-STAGE PLANETARY DRIVE

(71) Applicant: IMS GEAR GMBH, Donaueschingen (DE)

(72) Inventor: Heinz Gert Hagedorn, Rottwiel (DE)

(73) Assignee: IMS GEAR GMBH, Donaueschingen (DE)

( * ) Notice: Subject to any disclaimer, the term of this patent is extended or adjusted under 35 U.S.C. 154(b) by 0 days.

(21) Appl. No.: 13/777,774

(22) Filed: Feb. 26, 2013

(65) Prior Publication Data

US 2013/0252781 A1 Sep. 26, 2013

(30) Foreign Application Priority Data

Mar. 22, 2012 (EP) .................................. 12160880

(51) Int. Cl.
| | | |
|---|---|---|
| F16H 57/08 | (2006.01) | |
| F16H 1/46 | (2006.01) | |
| F16H 35/10 | (2006.01) | |

(52) U.S. Cl.
CPC . *F16H 1/46* (2013.01); *F16H 35/10* (2013.01)

(58) Field of Classification Search
CPC F16H 2001/289; F16H 57/02; F16H 2700/00
USPC .......................................... 475/331, 344, 345
See application file for complete search history.

(56) References Cited

U.S. PATENT DOCUMENTS

| | | | | |
|---|---|---|---|---|
| 4,590,811 | A | * | 5/1986 | Kasubuchi ....................... 74/7 E |
| 4,763,031 | A | * | 8/1988 | Wang ............................... 310/83 |
| 5,240,462 | A | * | 8/1993 | Mochizuki et al. ............ 475/342 |
| 5,336,136 | A | | 8/1994 | Jacqui |
| 2004/0045389 | A1 | * | 3/2004 | Pascoe ............................ 74/434 |
| 2004/0202518 | A1 | * | 10/2004 | Yaksich et al. ................. 408/240 |
| 2009/0062058 | A1 | * | 3/2009 | Kimes et al. ................... 475/344 |
| 2010/0261572 | A1 | * | 10/2010 | Riester et al. .................. 475/331 |

FOREIGN PATENT DOCUMENTS

| | | |
|---|---|---|
| DE | 10 2010 020 414 A1 | 5/2010 |
| EP | 0 170 505 A2 | 7/1985 |
| EP | 2 241 781 A1 | 1/2010 |
| EP | 2 369 125 A2 | 3/2011 |

* cited by examiner

*Primary Examiner* — Justin Holmes
(74) *Attorney, Agent, or Firm* — Todd L. Juneau

(57) ABSTRACT

The invention relates to a multi-stage planetary drive with at least two annulus gears with internal gears, connected to a housing in a torque-proof fashion, and with at least two sun gears, each of which combing planet wheels arranged on a pinion cage and an annulus gear; according to the invention it is provided that for the formation of a gear speed with at least one annulus gear, the housing is embodied in one piece as a cylindrical transmission housing with internal gears, for the formation of at least one additional gear speed a plastic annulus gear with internal gears is accepted by the transmission housing, and for the torque-proof connection of the plastic annulus gear to the transmission housing torque-proofing means are provided.

11 Claims, 2 Drawing Sheets

MULTI-STAGE PLANETARY DRIVE

CROSS REFERENCE TO RELATED APPLICATIONS

This patent application claims priority to European Patent Application 12 160 880.6, filed on Mar. 22, 2012.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

1. Field of the Invention

The invention relates to a multi-stage planetary drive.

The function of planetary drives is known. A sun gear is located in the center, which is driven by a motor, which is connected via a motor flange to the planetary drive. The sun gear transfers its motion to at least three revolving planet wheels forming a gear speed, which are arranged on bearing pins of a pinion cage. In case of several gear speeds the last pinion cage is connected to a driven shaft in a fixed manner and this way ensures the transmission of force at the driven side. At the exterior the planet wheels travel in an annulus gear connected to a housing in a torque-proof manner. Further, the housing is connected at the driven side to a driven flange.

2. Background of the Invention

The current state of knowledge is as follows.

The object of the invention is a multi-stage planetary drive with increased efficiencies, both in utility and cost, compared to such gears commercially available today.

With regard to the noise developing during the operation of a spur gear transmission it is known to provide the transmission arrangements with helical gears in order to allow a lower-noise operation. However, even in this way satisfactory noise behavior cannot be achieved in all cases, particularly in multi-stage planetary drives with simultaneous helical and spur gears.

Further, such multi-stage planetary drives are elaborate and expensive in their production, because the sprockets used as annulus gears with a spur gearing and a helical gearing must be screwed to each other and/or adhered to each other in order to form a one-part and/or two-stage sprocket before a sprocket formed in this manner can be accepted in a housing of the planetary drive.

The problem addressed by the invention is to provide a multi-stage planetary drive that operates at a lower noise level, and providing a simpler and more cost-efficient assembly mechanism than those currently available.

BRIEF SUMMARY OF THE INVENTION

In a preferred embodiment, a multi-stage planetary drive comprising at least two annulus gears connected in a torque-proof fashion to a housing with internal gears and at least two sun gears, each combing planet wheels and an annulus gear arranged on a pinion cage, further comprising wherein: for the formation of a gear speed with at least one annulus gear, the housing is formed in one piece as a cylindrical transmission housing with internal gears; for the formation of at least one additional gear speed, a plastic annulus gear with internal gears is accepted by the transmission housing; and a torque-proofing means is provided for a torque-proof connection of the plastic annulus gear to the transmission housing.

The multi-stage planetary drive disclosed herein, wherein the transmission housing comprises an accepting bore to accept the plastic annulus gear, adjusted to the external diameter of the plastic annulus gear and axially following the internal gears.

The multi-stage planetary drive disclosed herein, further comprising plug-in gears as torque-proofing means for the facial connection of the plastic annulus gear to the internal gears of the transmission housing.

A multi-stage planetary drive disclosed herein, characterized in that the plastic annulus gear comprises as plug-in gears at least one toothed element or toothed segment on its face pointing towards the internal gears engaging these internal gears of the transmission housing.

The multi-stage planetary drive disclosed herein, further comprising wherein geared elements are arranged annularly as plug-in gears on the face of the plastic annulus gear, which engage the internal gears of the transmission housing.

The multi-stage planetary drive disclosed herein, further comprising: a bearing flange, connected in a torque-proof fashion to the transmission housing; and at least one tongue and groove element as a torque-proofing means for a non-rotational connection of the plastic annulus gear to the bearing flange.

The multi-stage planetary drive disclosed herein, characterized in that the plastic annulus gear shows on the face pointing towards the flange at least one tongue and groove element, which engages a groove of the bearing flange.

The multi-stage planetary drive disclosed herein, further comprising wherein: the plastic annulus gear forms with the corresponding sun gear and the corresponding planet wheels a first gear speed; and the transmission housing with the internal gears forms a second gear speed together with the corresponding sun gear and the corresponding planet wheels.

The multi-stage planetary drive disclosed herein, further comprising wherein: the internal gears of the plastic annulus gear are formed as helical gears; and the internal gears of the transmission housing are formed as spur gears.

The multi-stage planetary drive disclosed herein, further comprising wherein the plastic annulus gear is formed as an injection molded part.

The multi-stage planetary drive disclosed herein, further comprising wherein the transmission housing is made from metal.

The multi-stage planetary drive disclosed herein, further comprising wherein the bearing flange is embodied as a motor flange.

DETAILED DESCRIPTION OF THE INVENTION

Figure 1:
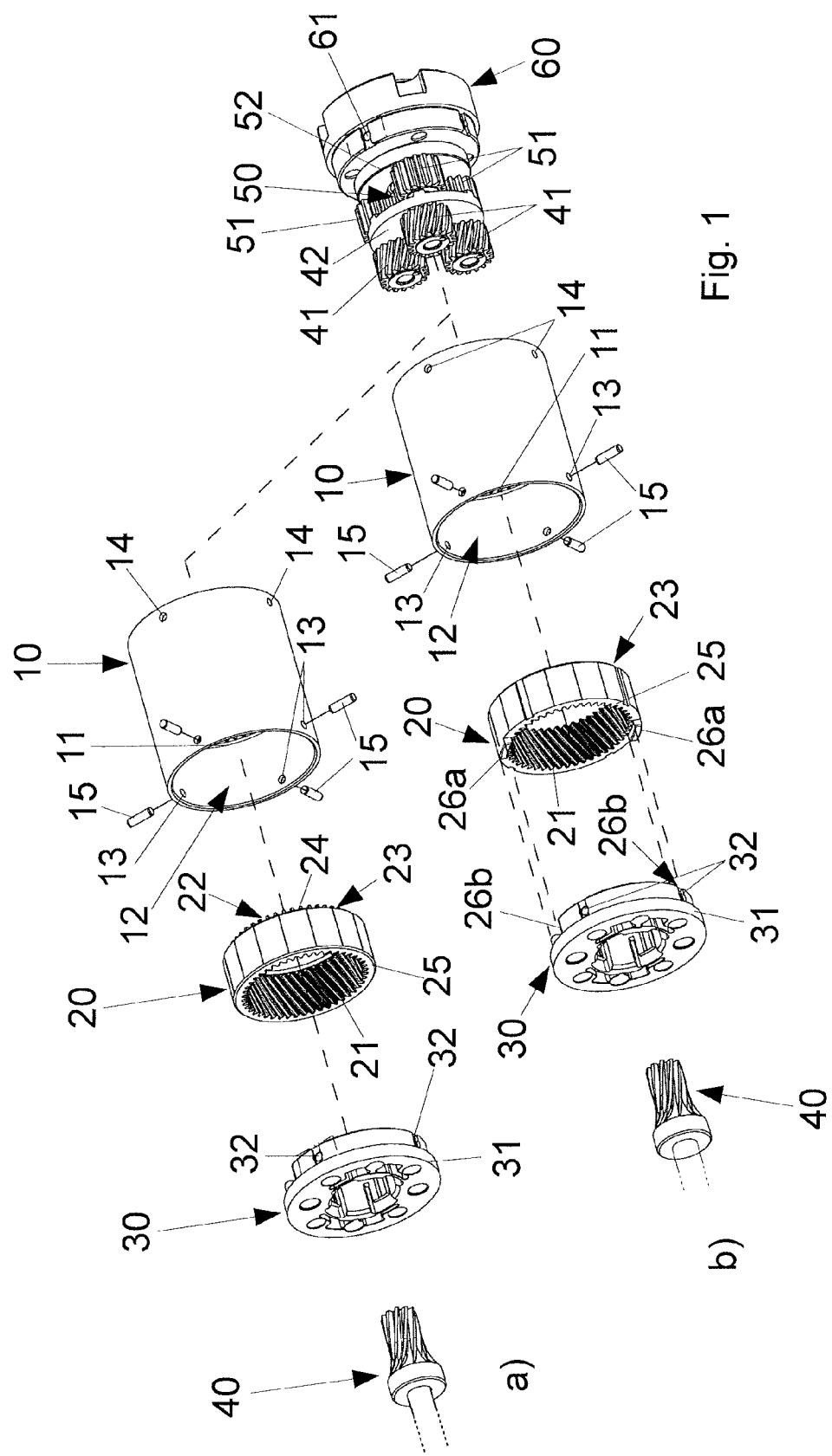
FIG. 1 is a line drawing evidencing an exploded view of a two-stage planetary drive in two exemplary embodiments of the invention.

The objective of the invention is to provide a multi-stage planetary drive of the type mentioned at the outset by which an improved noise behavior can be achieved and which simultaneously can be produced in a cost-effective fashion.

This objective is attained in a multi-stage planetary drive with at least two annulus gears connected in a torque-proof fashion to a housing with interior gears and at least two sun gears, each of which combing planet wheels arranged on a pinion cage and an annulus gear are characterized according to the invention such that for the formation of a gear speed with at least one annulus gear the housing is embodied as a cylindrical transmission housing in one piece with an internal gear, further for the formation of at least one additional gear speed a plastic annulus gear with internal gears is accepted in the transmission housing, and for a torque-proof connection of the plastic annulus gear with the transmission housing a means for torque-proofing is provided.

Using this solution according to the invention, due to the use of the plastic annulus gear, a considerably improved noise behavior can be achieved. Simultaneously the production of the planetary drive according to the invention with such a one-piece plastic annulus gear and one-piece transmission housing is considerably reduced, because on the one hand the production costs for these components are low and on the other hand the assembly is also easier using these parts.

In a further development of the invention it is provided for the transmission housing to comprise an accepting bore for accepting the plastic annulus gear, adjusted to the external diameter of the plastic annulus gear and axially following the internal gears. Due to the fact that this way the annulus gears are directly adjacent, a more compact design of the planetary drive according to the invention develops, with simultaneously this accepting bore allowing a simple assembly of the plastic annulus gear.

In an advantageous embodiment of the invention, for the facial connection of the plastic annulus gear with the internal gears of the transmission housing, a plug-in gearing is provided as a means for torque-proofing. This leads to an improved transfer of momentum of the plastic annulus gear, particularly when the plastic annulus gear shows a helical gearing, the axial forces developing here are better accepted.

Preferably, according to a further development of the invention the plug-in gears are realized such that the plastic annulus gear comprises on its face pointing towards the internal gears at least one toothed element or toothed segment engaging these internal gears of the transmission housing. An improved force transfer develops according to a further development such that these toothed elements are arranged ring-shaped on the face of the plastic annulus gear, engaging the internal gears of the transmission housing.

In another embodiment it is provided to implement a bearing flange, connected to the transmission housing in a torque-proof fashion, which preferably represents a motor flange, and to use it for torque-proofing by at least one tongue and groove element being used as a torque-proofing means for a non-rotational connection of the plastic annulus gear to the bearing flange. Preferably, such a tongue and groove element is embodied such that the plastic annulus gear comprises at least one tongue element on the face pointing towards the flange and this tongue element engages a groove of the bearing flange. Here, such a bearing flange is connected, for example, via a threaded connection to the transmission housing in a torque-proof fashion.

When according to a further development the bearing flange serves as a motor flange, the plastic annulus gear with the allocated sun gear and the allocated planet wheels forms a first gear speed, with the transmission housing comprising the internal gears together with the corresponding sun gear and the corresponding planet wheels forming a second gear speed. In a two-stage planetary drive the pinion cage of this second gear speed forms the driven axle.

It is particularly advantageous according to another embodiment of the invention when the internal gears of the plastic annulus gear are embodied as helical gears, with the internal gears of the transmission housing showing spur gears. Using these helical gears of the plastic annulus gear another noise reduction is achieved during operation.

In a simple and cost-effective fashion, according to another further development, the plastic annulus gear can be produced as an injection molded part. Preferably, metal is used here for the transmission housing.

DETAILED DESCRIPTION OF THE FIGURES

Now turning to the figures, the two-stage planetary drive shown in FIG. 1a and FIG. 1b comprises a one-piece transmission housing 10 made from metal with spur internal gears 11, a plastic annulus gear 20 with helical internal gears 21, a first pinion cage 42 carrying planet wheels 41, as well as a second pinion cage 52 carrying planet wheels 51. A sun gear 50, connected to the first pinion cage 42, combs the planet wheel 51; the second pinion cage 52 is connected to the driven shaft, not shown in FIG. 1, and forms the face of the transmission housing 10 at the driven side.

On the opposite face of the transmission housing 10 a bearing flange forms the end piece as the motor flange 30, connected to a motor, not shown. The drive shaft of this motor shown schematically in FIG. 1 comprises a sprocket, which as the sun gear 40 combs the plastic annulus gear to form a first gear speed with the planet wheels 41 and the internal gears 21. A second gear speed is formed by the sun gear 50 together with the planet wheels 51 and the gears 11 of the transmission housing 10.

Figure 2:
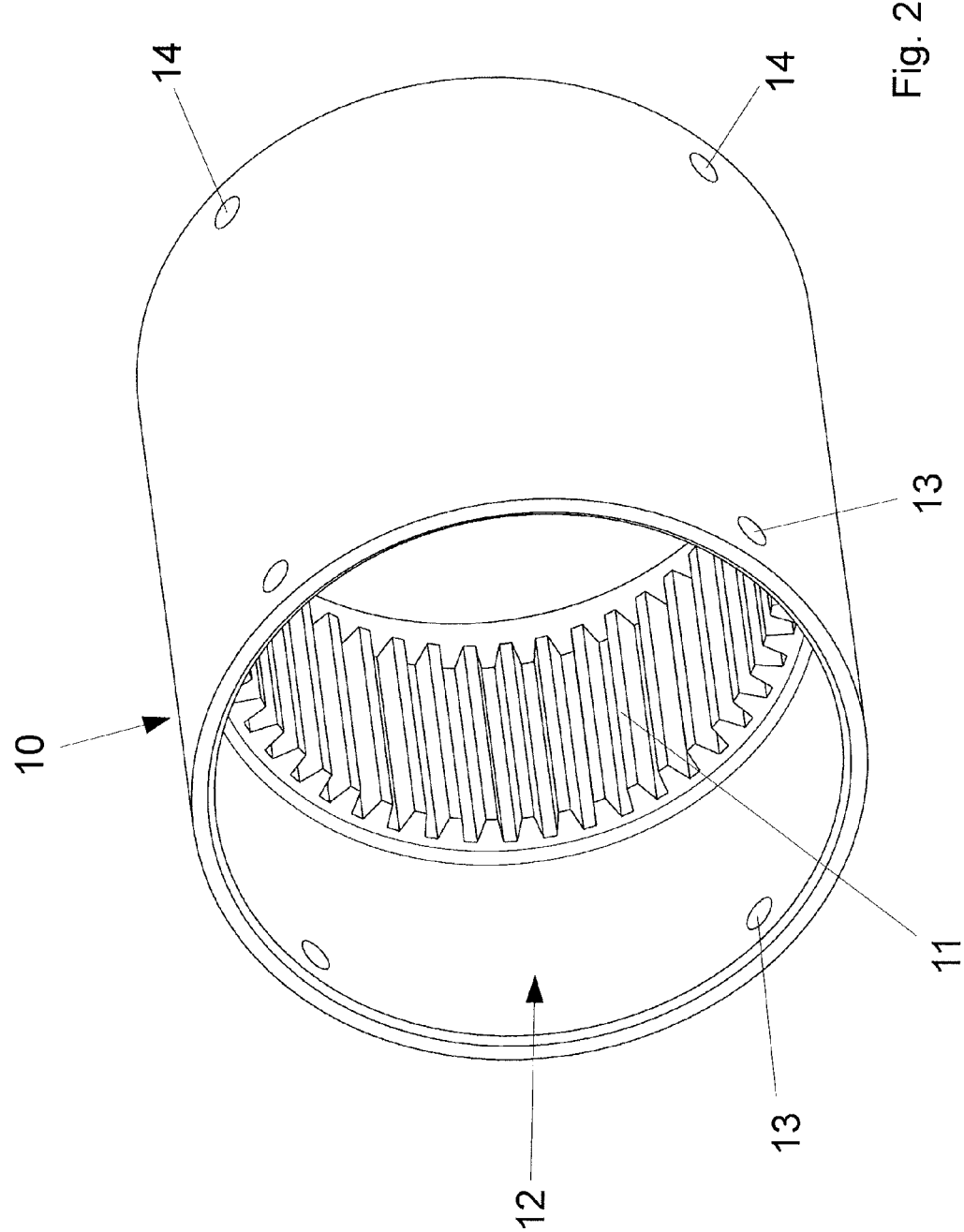
FIG. 2 is line drawing evidencing a perspective view of the transmission housing according to FIG. 1.

FIG. 2 shows the tubular transmission housing 10 with the internal gears 11 in an enlarged illustration. This transmission housing 10 shows an accepting bore 12 for the plastic annulus gear 20 on the drive side. Thus, the internal diameter of this accepting bore 12 is adjusted to the external diameter of the plastic annulus gear 20 such that by inserting it into the accepting bore 12 the plastic annulus gear 20 contacts with its face 23 the sprocket formed by the internal gears 11.

The torque-proof connection of the plastic annulus gear 20 to the transmission housing 10 is realized in different fashions in the two FIGS. 1a and 1b.

For example, the plastic annulus gear 20 according to FIG. 1a shows on its face 23 plug-in gears 22, which are formed by helical toothed elements 24, which are radial and circumferential on this face 23. In the state installed in the transmission housing 10 these toothed elements 24 engage the cleared spur gears 11 so that this way a torque-proof connection to the transmission housing 10 develops when after the insertion of the plastic annulus gear 20 the motor flange 30 is also inserted into the accepting bore 12. Here, the depth of this accepting bore 12 is selected such that the plastic annulus gear 12 is held between the internal gears 11 of the transmission housing 10 and the motor flange 30 without any axial play. The motor flange 30 shows a circumferential shoulder 31, which contacts the face of the transmission housing 10 and is screwed to the transmission housing 10 with threaded means 15 via bores 13 into the cylindrical wall of the transmission housing 10, which correspond with the respective bores 32 in the motor flange 30.

The torque-proofing according to FIG. 1b occurs, however, via a torque-proof connection of the plastic annulus gear 20 to the motor flange 30, which is shown in the same manner as in FIG. 1a, using threaded means 15 and corresponding bores 13 and 32 being screwed to the transmission housing 10. This torque-proofing occurs via tongue and groove elements 26a and 26b, with two diametrically opposite tongue elements 26a being arranged on the drive-side face 25 of the plastic annulus gear 20, which here engage corresponding grooves 26b of the motor flange 30, when both the plastic annulus gear 20 as well as the motor flange 30 have been accepted without axial play in the accepting bore 12 of the transmission housing 10.

In a similar fashion, the driven flange 60 with the pinion cages 42 and 52 is connected to the transmission housing 10 in a torque-proof fashion via threaded connection means and corresponding bores 14 in the transmission housing 10 and bores 61 in the driven flange 60.

The noise behavior of this planetary drive shown in FIG. 1 is considerably improved by the use of the plastic annulus gear 20 with helical gears, produced as a one-piece injection molded part. This way, on the one hand, the production costs are reduced and on the other hand even lower assembly costs are achieved, because prior to the assembly of the driven flange 60 with the corresponding parts only the plastic annulus gear and the motor flange must be inserted into the transmission housing 10 and screwed here.

The exemplary embodiments according to FIG. 1 show a two-stage planetary drive. Of course, higher-stage transmissions may also be generated by installing several axially successive plastic annulus gears in an accepting bore of the transmission housing, with these plastic annulus gears being connected to each other in a torque-proof fashion with a plug-in gear connection or via tongue and groove elements.

Further, another pinion cage may be provided for the formation of another gear speed, with its planet wheels also combing the internal gears of the transmission housing.

Advantageously such multi-stage planetary drives can be used in automotive construction, particularly for opening and/or closing rear hatches of motor vehicles.

LIST OF REFERENCE NUMBERS 10 transmission housing
11 internal gears
12 accepting bore
13 bores of the transmission housing
14 bores of the transmission housing
15 threaded connection means
20 plastic annulus gear
21 internal gears of the plastic annulus gear 20
22 plug-in gears
23 face of the plastic annulus gear 20
24 toothed element
25 face of the plastic annulus gear 20
26a tongue element
26b groove
30 bearing flange, motor flange
31 shoulder of the motor flange
32 bores in the motor flange
40 sun gear
41 planet wheels
42 pinion cage of the planet wheels 41
50 sun gear
51 planet wheels
52 pinion cage of the planet wheels 51
60 driven flange
61 bores in the driven flange The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

I claim:

1. A multi-stage planetary drive comprising at least two annulus gears connected in a torque-proof fashion to a housing with internal gears and at least two sun gears, each combing planet wheels and an annulus gear arranged on a pinion cage, further comprising wherein:
    for the formation of a gear speed with at least one annulus gear, the housing is formed in one piece as a cylindrical transmission housing with internal gears;
    for the formation of at least one additional gear speed, a plastic annulus gear with internal gears is housed completely within and accepted by the transmission housing; and
    plug-in gears as torque-proofing means for the facial connection of the plastic annulus gear to the internal gears of the transmission housing.

2. The multi-stage planetary drive of claim 1, wherein the transmission housing comprises an accepting bore to accept the plastic annulus gear, adjusted to the external diameter of the plastic annulus gear and axially following the internal gears.

3. A multi-stage planetary drive of claim 1, characterized in that the plastic annulus gear comprises as plug-in gears at least one toothed element or toothed segment on its face pointing towards the internal gears engaging these internal gears of the transmission housing.

4. The multi-stage planetary drive of claim 3, further comprising wherein geared elements are arranged annularly as plug-in gears on the face of the plastic annulus gear, which engage the internal gears of the transmission housing.

5. The multi-stage planetary drive of claim 3, characterized in that the plastic annulus gear shows on the face pointing towards the flange at least one tongue and groove element, which engages a groove of the bearing flange.

6. The multi-stage planetary drive of claim 1, further comprising:
    a bearing flange, connected in a torque-proof fashion to the transmission housing; and
    at least one tongue and groove element as a torque-proofing means for a non-rotational connection of the plastic annulus gear to the bearing flange.

7. The multi-stage planetary drive of claim 6, further comprising wherein the bearing flange is embodied as a motor flange.

8. The multi-stage planetary drive of claim 1, further comprising wherein:
    the plastic annulus gear forms with the corresponding sun gear and the corresponding planet wheels a first gear speed; and
    the transmission housing with the internal gears forms a second gear speed together with the corresponding sun gear and the corresponding planet wheels.

9. The multi-stage planetary drive of claim 1, further comprising wherein:
    the internal gears of the plastic annulus gear are formed as helical gears; and
    the internal gears of the transmission housing are formed as spur gears.

10. The multi-stage planetary drive of claim 1, further comprising wherein the plastic annulus gear is formed as an injection molded part.

11. The multi-stage planetary drive of claim 1, further comprising wherein the transmission housing is made from metal.

* * * * *